United States Patent [19]

Stearns

[11] 4,027,472
[45] June 7, 1977

[54] FUEL CONTROL

[75] Inventor: Charles F. Stearns, East Longmeadow, Mass.

[73] Assignee: United Technologies Corporation, Hartford, Conn.

[22] Filed: Mar. 5, 1976

[21] Appl. No.: 664,132

Related U.S. Application Data

[62] Division of Ser. No. 559,458, March 18, 1975, Pat. No. 3,975,903.

[52] U.S. Cl. .......................... 60/39.28 R; 60/39.27; 60/39.29
[51] Int. Cl.² .......................................... F02C 9/08
[58] Field of Search ......... 60/39.28 R, 39.27, 39.29

[56] References Cited

UNITED STATES PATENTS

| | | | |
|---|---|---|---|
| 3,064,421 | 11/1962 | Jurisch | 60/39.28 R |
| 3,187,505 | 6/1965 | Plummer | 60/39.28 R |
| 3,192,988 | 7/1965 | Porter | 60/39.28 R |
| 3,596,466 | 8/1971 | Smith | 60/39.28 R |
| 3,611,719 | 10/1971 | Stearns | 60/39.28 R |
| 3,784,130 | 1/1974 | Robinson | 60/39.28 R |
| 3,953,967 | 5/1976 | Smith | 60/39,28 R |

*Primary Examiner*—Clarence R. Gordon
*Attorney, Agent, or Firm*—John D. Del Ponti

[57] ABSTRACT

This invention relates to fuel controls for turbine types of power plants and to the means for resetting the idle speed and stator vanes from a single point contact. In one embodiment, fuel flow is reset by changing the hydraulic forces on the throttle valve and its control system which serves to provide a $W_f/P_3 \times P_3$ control function, where $W_f$ = fuel flow in pounds per hour and $P_3$ = compressor discharge pressure in pounds per square inch absolute. The profile of the 3-D cam utilized to control the stator vanes is also utilized to set the droop schedule of the idle speed setting controlled by the fuel control.

4 Claims, 6 Drawing Figures

FUEL CONTROL

This is a division of application Ser. No. 559,458, filed Mar. 18, 1975, now U.S. Pat. No. 3,975,903.

BACKGROUND OF THE INVENTION

This invention relates to fuel controls for turbine types of power plants and particularly to improvements of the type exemplified by U.S. Pat. No. 2,822,666 assigned to the same assignee, and the types typified by the JFC-12, JFC-25, JFC-60 manufactured by Hamilton Standard Division of United Aircraft Corporation.

As is well known in the fuel control art, the fuel control not only serves to control fuel flow but has also been utilized to control many other aspects associated with engine control. As for example, the fuel control may be utilized to control the engine stator vanes, bleed valves or other aspects of the engine. It should be realized that in some applications these functions noted above may be independently controlled. This invention finds utility where the fuel control includes the function of controlling fuel flow to the power plant as well as the function of controlling the stator vanes of the power plant.

In this regard, the invention serves to provide the dual function of automatically resetting idle speed to maintain constant engine power and setting of the position of the variable stator vanes by utilizing a single cam and a single cam follower. This is in contrast to utilizing two cams with two followers or a single cam with two profiles each of which has its own follower.

Additionally, by proper sizing of lever ratios and spring rates the single point contact defines the idle droop schedule.

Another aspect of this fuel control is to provide the $W_f/P_3 \times P_3$ fuel control function by utilizing the throttle valve to perform the multiplying. Hence, where it has been customary to utilize a fulcrum lever and force system to accomplish this function this invention contemplates controlling the hydraulic pressure forces acting across the throttle valve and contouring one of its windows in a unique manner to obtain this function.

In this light, the fuel control schedules $W_f/P_3$ as a function of compressor speed and power lever position for steady state, and as a function of compressor speed, compressor inlet temperature for acceleration and multiplies this value by $P_3$ in order to achieve effective fuel control while assuring that the engine does not encounter rich or lean blow out, overtemperature and surge.

SUMMARY OF THE INVENTION

An object of this invention is to provide an improved fuel control.

A still further object of this invention is to provide for a fuel control for a turbine type power plant a single cam and follower to obtain the dual function of stator vane positioning and fuel flow.

A still further object of this invention is to multiply $W_f/P_3$ by $P_3$ by controlling the servo fluid positioning the throttle valve and utilizing the throttle valve as a function generator.

A still further object of this invention is to provide for a fuel control as described a fuel shut off mechanism that includes cam and linkage means that serve the additional function of providing the maximum fuel flow limit.

Other features and advantages will be apparent from the specification and claims and from the accompanying drawings which illustrate an embodiment of the invention.

DESCRIPTION OF THE PREFERRED EMBODIMENT

Figure 1A:
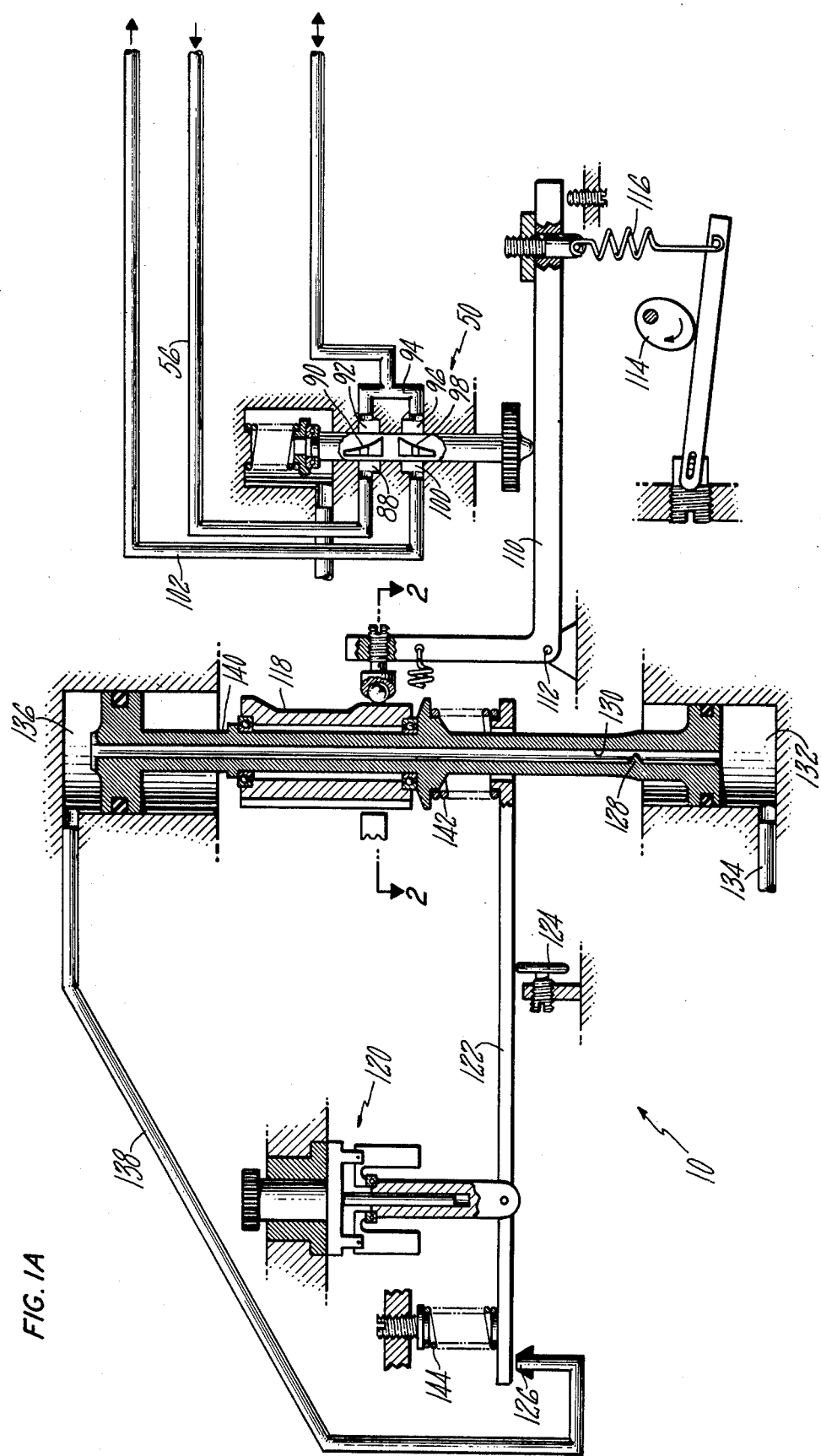
FIGS. 1A and 1B is a schematic illustration of the invention.

This invention can best be understood by referring to FIG. 1A and FIG. 1B which schematically shows the fuel control generally illustrated by reference numeral 10 controlling both the stator vanes 14 and fuel to the power plant 16. It should be understood as one skilled in this art will appreciate that any type of power plant, be it single or twin spool, fan, solid shaft, free turbine or the like is contemplated within the scope of this invention.

As can be seen, fuel control 10 comprises the metering section, the stator vane actuator section, and the computer section. The metering section essentially consists of throttle valve 18, suitable pump 20 and pressure regulator 22. Basically, the metering system regulates the flow of fuel dictated by the demands of the computer section by pressurizing fuel and metering it through windows 24 and 26 formed in throttle valve 18 via line 28 and 30, and annular passage 32, where it ultimately flows to the burner section of the engine. As will become more apparent from the description to follow, window 26 is a function generator and is contoured so as to create a pressure drop thereacross such that the displacement of valve 34 is proportional to $W_f$.

Essentially, throttle valve 18 comprises spool 34 disposed in bore 36 and is rotatably supported therein by bore 36. The shaft 40 extends into bore 36 formed at the top end of spool 34 and terminates short of bearing 42 defining chamber 44. Spring 46 disposed in chamber 44 bears against the end of shaft 40 and spool 34, via bearing 42 urging spool 34 in a downward direction.

Drilled passage 48 axially extending in spool 34 communicates with annular passage 32 for directing fluid in annular passage 32 to the $W_f/P_3$ valve 50 via drilled passage 52, chamber 44, port 54 and line 56.

Pressure regulator 22 which may be any suitable type as for example the type employed by the JFC-12, JFC-25 and JFC-60 or the one disclosed in U.S. Pat. No. 2,822,666 supra, serves to maintain the pressure drop across the metering orifice 24 at a predetermined constant value. Suffice it to say that the valve 22 senses the pressure upstream of metering orifice 24 (pressure in line 28) by applying it to the top end of metering element 60 via line 62 and branch line 64 and pressure downstream of orifice 24, (annular passage 32 pressure) to the opposite end of element 60 via line 66. Hence these pressures and the force of spring 68 bearing on metering element 60 positions metering element 60 so as to port excessive fuel to the inlet of pump 20, to maintain the pressure drop across window 24 constant. Since the upstream pressure acting on top of element 60 and the downstream pressure acting on the bottom thereof act over equal areas, the force of spring will determine the value of the pressure drop, which may be say 40 psi.

As mentioned above throttle valve 18 serves to multiply $W_f/P_3$, the scheduled signal, by actual $P_3$. Actual $P_3$ sensed by bellows 70 which is referenced to an absolute value by evacuated bellows 72 is applied to lever 74 pivotally mounted by pivot 76. Roller 78 bearing against bearing retainer 80 serves to position spool 34 and hence both windows 24 and 26 of valve 18.

In addition to this $P_3$ force and the spring forces of springs 82 and 46, spool 34 is subjected to the force created by the pressures of fluid in chambers 44 and 84 acting on the top and bottom portion thereof. These pressures which are controlled by $W_f/P_3$ pilot valve 50 serves to produce the $W_f/P_3$ scheduled signal. As noted, pressure in annular passage 32 ultimately fed to the engine through line 30 is directed to pilot valve 50 via line 56 and port 88. The flow and pressure are affected by the areas of contoured windows 90 and 98 as the flow passes through valve 50 via port 92, branch line 94, port 96, contoured orifice window 98, port 100 and line 102, and thereby establishes the pressure drop across valve spool 34.

Figure 3:
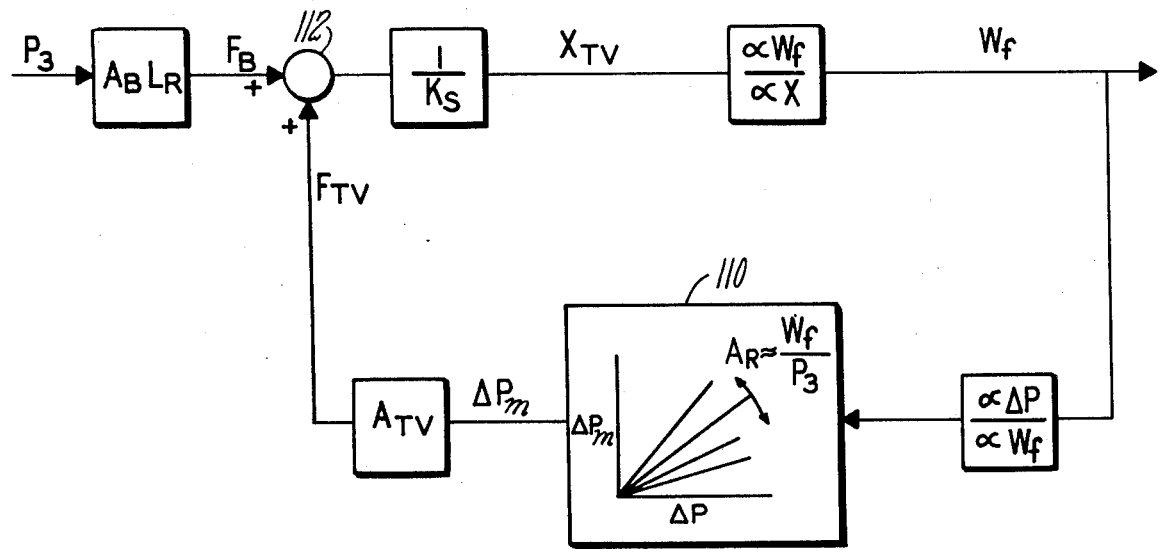
FIG. 3 is a block diagram illustrating the multiplication aspect of this invention.

For a better understanding of the multiplication system reference is made to FIG. 3 showing a block diagram of the functions of the elements described immediately above. For the purpose of this description the following symbols will be employed.

$P_3$ = compressor discharge pressure
$A_B$ = bellows effective area
$L_R$ = lever ratio between bellows and throttle valve
$F_B$ = force due to bellows
$K_S$ = throttle valve spring rate
$X_{TV}$ = throttle valve travel
$W_f$ = fuel flow
$\Delta P$ = pressure generated by throttle valve function window
$A_R$ = area ratio of $W_f/P_3$ valve
$P_m$ pressure resulting after being divided by $A_R$ valve
$A_{TV}$ = throttle valve area acted on by $P_m$ As noted the sum of the force created by actual $P_3$ and the force created by the pressure acting in chambers 44 and 84 (FIG. 1B) as determined by the $W_f/P_3$ pilot valve 50 displace throttle valve 18 to produce $W_f$. The contour window 26 of throttle valve 18 is hence, a function generator and serves to establish the desired pressure drop ($\Delta P$) to produce the schedule shown in block 110. Hence the force effect of throttle valve 18 resulting from the pressures and areas of the contoured window produces a $W_f/P_3$ signal which when added at the summation point 112 produces the $W_f$ value metered to the engine.

The efficacy of this multiplication can be seen by the following mathematical derivation. The diagram of FIG. 3 can be represented by the equations used hereinbelow.

Eq. 1

$$\left[ P_3(A_B L_R) + W_f \left(\frac{\delta \Delta P}{\delta W_f}\right)\left(\frac{\delta \Delta P_m}{\delta \Delta P}\right)(A_{TV}) \right] \frac{1}{K_S} \frac{\delta W_f}{\delta X} = W_f$$

Dividing by $P_3$ Equation 2 is obtained

Eq. 2

$$\left(\frac{\delta W_f}{\delta x}\right)\frac{A_B L_R}{K_S} + \left(\frac{\delta \Delta P}{\delta W_f} \cdot \frac{\delta W_f}{\delta x} \cdot \frac{\delta \Delta P_m}{\delta \Delta P} \cdot \frac{A_{TV}}{K_S}\right)\frac{W_f}{P_3} = \frac{W_f}{P_3}$$

simplifying to obtain Equation 3

Eq. 3

$$\frac{\left(\frac{\delta W_f}{\delta x}\right)\frac{A_B L_R}{K_S}}{\left(1 - \frac{\delta \Delta P}{\delta W_f} \cdot \frac{\delta \Delta W_f}{\delta x} \cdot \frac{\delta \Delta P_x}{\delta \Delta P} \cdot \frac{A_{TV}}{K_S}\right)} = \frac{W_f}{P_3}$$

From Equation 3 it can be seen that all values are known and constant except $\delta \Delta P_m/\delta \Delta P$ and $W_f/P_3$. Therefore knowing $W_f/P_3$ an $A_R$ can be predetermined and cut into the window on the $W_f/P_3$ valve to produce the proper $\delta \Delta P_m/\delta \Delta P$ to satisfy the $W_f/P_3$ required. If an $A_R$ is selected by the $W_f/P_3$ valve position and if $P_3$ is applied to the bellows the proper $W_f$ is obtained from the system.

Figure 1B:
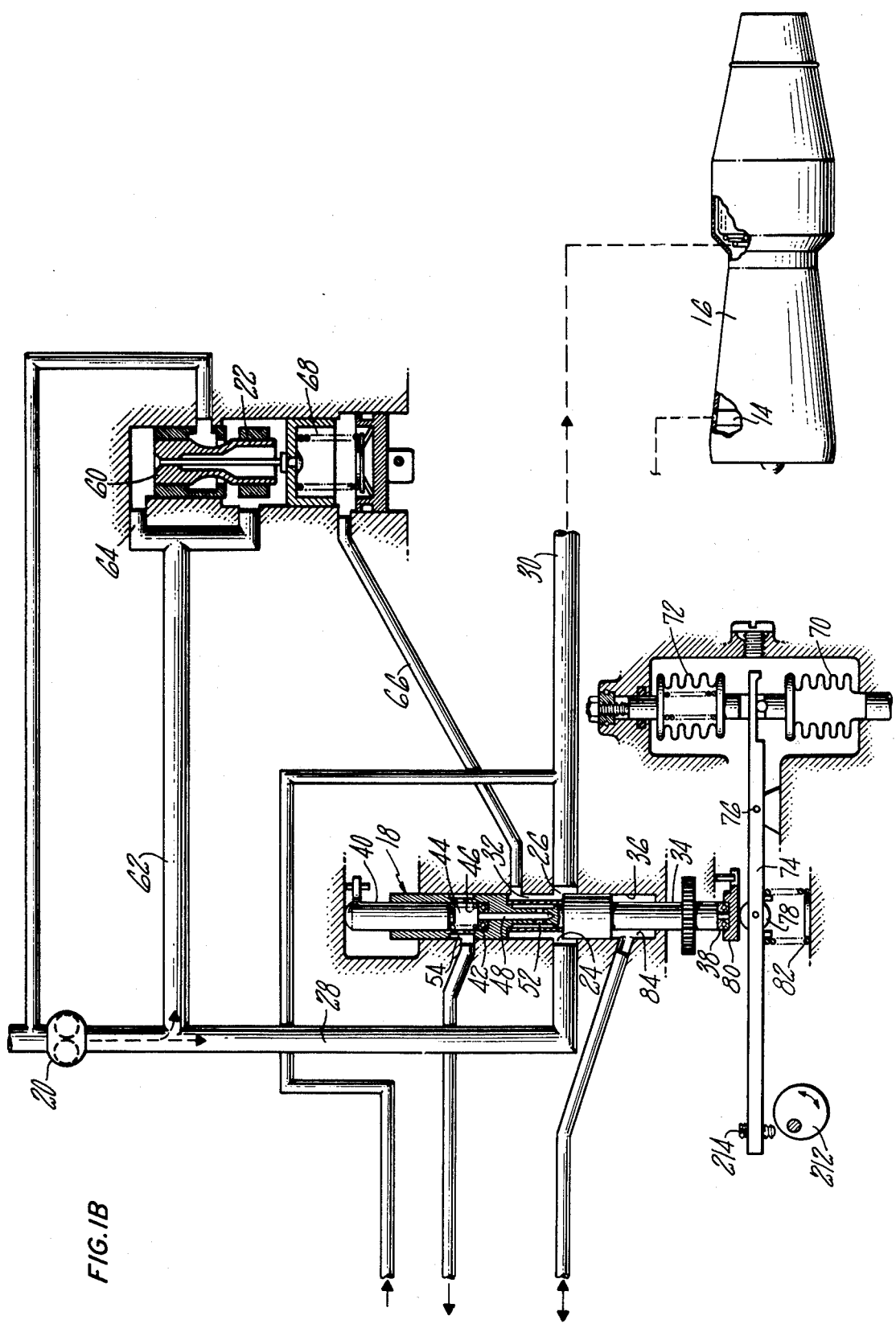

From the foregoing and as noted from FIGS. 1A and 1B it is apparent that the displacement of valve 50, establishes the area of windows 90 and 98 and in turn determines the scheduled $W_f/P_3$ signal. This value is established by the position of bell crank 110 which is pivotally mounted to pivot 112. The power lever signal which is connected to power resetting cam 114 sets the force on spring 116 which is directly connected through suitable attachment mechanism to one end of bell crank 110.

Acceleration schedule is determined by the setting of 3-D cam 118 which is rotated as a function of compressor inlet temperature and translated as a function of compressor speed. The flyweight speed sensor 120 driven by the engine's compressor moves lever 122 about pivot 124 upon a speed change. This in turn resets curtain area of nozzle 126 to change the flow resistance discharging therefrom and change the pressure drop across fixed restriction 128 formed in drilled passage 130. Hence pressurized fluid admitted into chamber 132 via line 134, flows through drilled passage 130, through chamber 136, through line 138 and discharges to sump or drain pressure through nozzle 126. Obviously, the setting of nozzle 126 establishes the pressure in chamber 136 and hence positions 3-D cam 118 which is secured to the piston rod 140 rectilinearly. Movement of rod 140 adjusts the height of spring 142 for reestablishing the force balance on lever 122 which is subjected to the forces of adjustable spring 144 and fluid egressing from the nozzle 126 to null out or balance the servo system.

Figure 2:
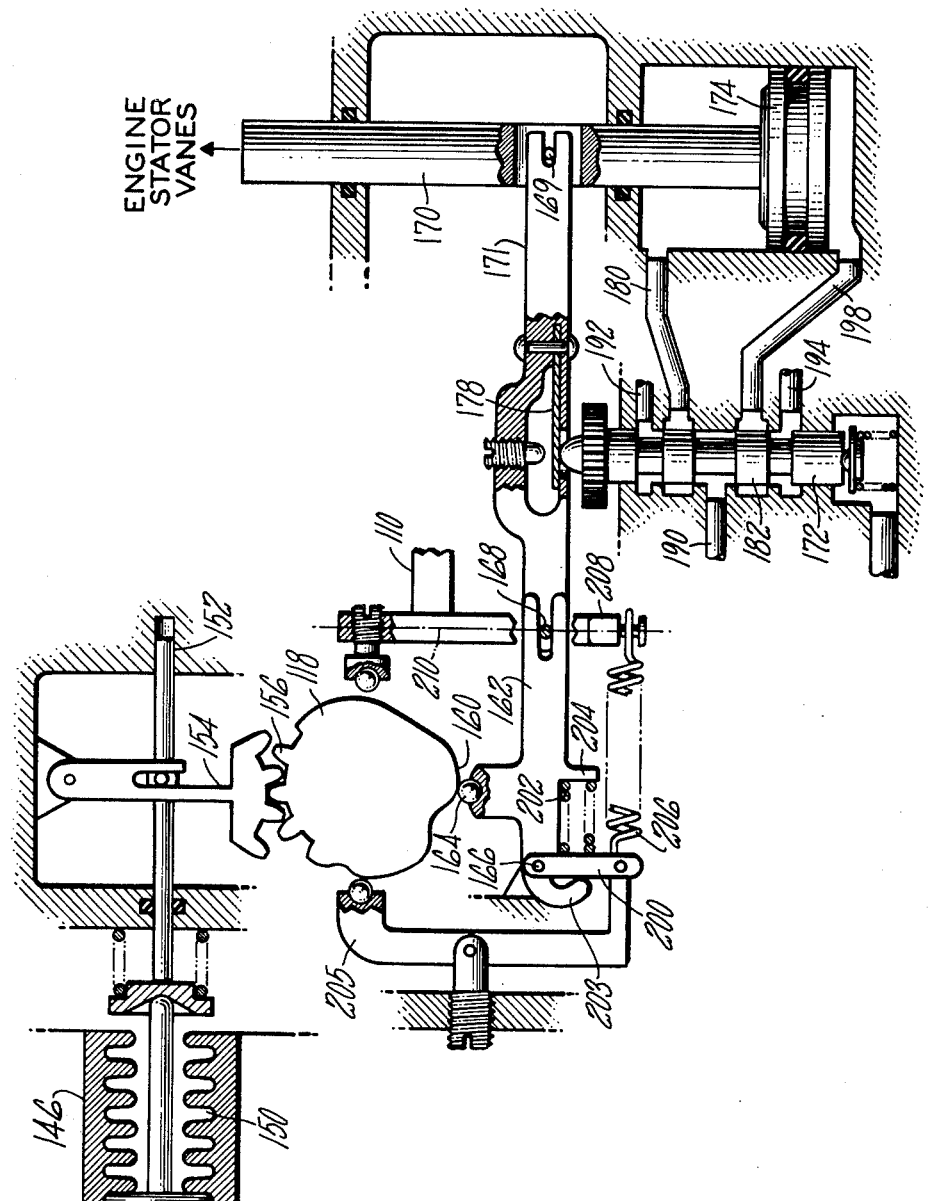
FIG. 2 is a view partly in section and partly in schematic taken along line 2—2 of FIG. 1A.

As noted in FIG. 2, 3-D cam 118 is rotated by the compressor inlet temperature assembly 146 which comprises a suitable bellows temperature sensor 150 bearing against spring loaded rod 152. Movement of bellows 150 through the segmented gear assembly 154 meshing with gear 156 serves to rotate cam 118 as a function of temperature sensed.

Both the temperature and speed sensing mechanism as well as the 3-D cam are fully disclosed in the fuel control models and U.S. Pat. No. 2,822,666 supra and for further details reference should be made thereto.

Suffice it to say that $W_f/P_3$ is scheduled by compressor speed and compressor inlet temperature as manifested by the 3-D cam.

As mentioned above the fuel control serves to position the stator vane of the engine and does so by utilizing the existing 3-D cam. Since the position of cam 118 is already a function of compressor inlet temperature and speed, the profile 160 is contoured to give the desired stator vane position. Hence, the two piece lever 162 carries follower 164 bearing against cam 118 and is pivotally mounted on either end to pivot 166 and pin 168 affixed to the stator vane actuator lever 171. The lever 162 is made in two pieces for reasons that will become apparent in the following description.

For normal operation suffice it to say that lever 162 acts to position lever 171 bearing against pilot valve 172 and pin 169. Pilot valve 172 serves to control piston 174 of the stator vane actuator by admitting pressurized fluid to either side thereof for positioning connecting rod 170 rectilinearly which in turn rotates through suitable mechanism (not shown) the stator vane. A spring override 178 is provided to allow for overtravel of the lever after the piston has reached the end of its travel.

Pilot valve 172 may be any suitable spool type as shown or any other servo control valve that serves to position the stator vane actuator in response to an input signal which is a function of compressor inlet temperature and speed. High pressure fluid is ported to either end of piston 174 via line 198 and 180 by displacing spool 182 so that the proper lands uncover these lines to the high pressure lines 190. When one end of piston is communicating to high pressure, the other end is communicating to drain, via either line 192 or 194.

It is thus apparent from the foregoing that displacement of lever 162 by virtue of the follower causes displacement of lever 171 and of spool 182 and corresponding displacement of piston rod 170, which returns lever 171 to its original position and consequently nulls pilot valve 172.

In accordance with another feature of this invention the profile 160 which serves to define the schedule for the stator vane actuator is also utilized to provide the idle reset schedule. Hence, only a single cam follower 164 is necessary. This invention contemplates pinning link 200 to pivot 166 and disposing spring 202 between it and depending arm 204 formed on lever 162. Spring 202 provides a force to keep link 200 in contact with arm 203 on lever 162 except when prevented by lever 205. This link 200 above idle is overridden by lever 205 and spring 206 positioned by lever 205. This permits the cam follower 164 to transmit a signal through arm 203, link 200 and hence change the load on spring 206 which is connected to link 200 and bell crank 110. Since spring 206 is connected to arm 208 of bell crank 110 at a point spaced at a plane parallel to the plane in which the pivot point 112 is mounted, bell crank 110 will rotate about axis 210 (the axis of rotation of pivot point 112) to reposition $W_f/P_3$ valve 50. This in turn adjusts fuel flow so that the idle setting will be reset so as to maintain a constant horsepower.

Figure 5:
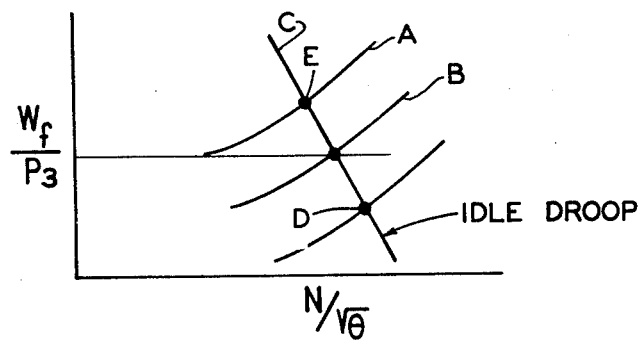
FIG. 5 is a graph showing a portion of the engine operating steady state schedule for illustrating the droop line established by this invention and is a plot of $W_f/P_3$ ratio vs. corrected speed.

As noted from FIG. 5 which is a plot of $W_f/P_3$ vs. corrected speed upon a change on compressor speed or temperature the idle point A which intersects the steady state line B and droop line C will be reset to point represented by D and E depending on the polarity of the horsepower change, and the change will follow the droop schedule until the droop line intersects the proper steady state curve.

Figure 4:
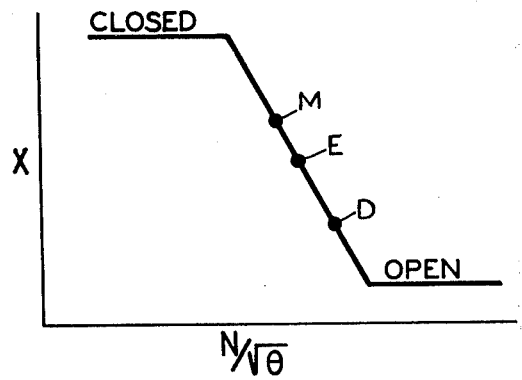
FIG. 4 is a graph of the stator vane schedule plotting corrected engine speed vs. stator vane position.

The droop schedule, i.e. line C of FIG. 5 is manifested by selecting the proper conditions of the profile of cam 118 and the proper lever ratios and spring rates. As noted in FIG. 4 the schedule of the stator vane is represented by the plot of X (stator vane position) vs corrected speed. The curve M shows the transition between closed and open position of the stator vanes, i.e. minimum area to maximum area opening of the vanes. By selecting the proper operational points on curve M and utilizing this portion of the curve to reset idle and by the proper selection of the length of link 200 and spring 206 it is possible to define the slope and hence droop of the idle curve C of FIG. 5.

Cam 212 which is operatively connected to the condition lever (not shown) which permits the pilot to shut-down fuel is also utilized in this invention as the dual function of defining the maximum fuel flow limit. As shown, during normal operation cam 212 is rotated so that the adjusting screw 214 is spaced therefrom. Should spool 34 of throttle valve 18 move downwardly a sufficient distance, which is in the more fuel flow direction, lever 74 will move in a counterclockwise direction until screw 214 abuts against cam 212 and prevent further movement. Hence the throttle valve 18 will be at its maximum fuel flow position. Obviously rotating cam 212 so that its maximum radius is at the point where it contacts set screw 214 will cause spool 34 to move upwardly to close-off throttle valve 18 for shut down of the engine.

It should be understood that the invention is not limited to the particular embodiments shown and described herein, but that various changes and modifications may be made without departing from the spirit or scope of this novel concept as defined by the following claims.

I claim:

1. A fuel control for a turbine type power plant having a compressor, said fuel control responding to compressor inlet temperature and compressor speed for providing an acceleration schedule and compressor speed and power lever position for providing a steady state schedule, means responsive to said acceleration schedule and steady state schedule for producing a signal indicative of a ratio of fuel flow to compressor pressure providing an input signal, means producing a signal as a function of actual compressor pressure as an additional input signal, means for multiplying said input signal and said additional input signal, said means including a throttle valve disposed in a cylinder and having a reaction surface and a land adjusting the area of serially connected orifices formed in said cylinder, a pilot valve having a pair of serially connected contoured orifices formed therein, hydraulic means leading pressurized fluid from a pressure source through one of said contoured orifices and through said other contoured orifices and downstream of said throttle valve and a fluid connection interconnecting said reaction surface and said hydraulic means at a point between said pair of serially connected contoured orifices for positioning said throttle valve and means responsive to said additional input means for further positioning said throttle valve.

2. A fuel control as claimed in claim 1 including a pressure regulator maintaining the pressure drop across one of said orifices formed in said cylinder of said throttle valve at a constant value.

3. A fuel control as claimed in claim 2 including a bellows subjected to compressor pressure, and a lever interconnecting said bellows and said throttle valve to position said throttle valve and as a function of actual compressor pressure.

4. A fuel control as claimed in claim 3 including means to reference the output of said bellows to an absolute value and wherein said compressor pressure is the pressure downstream of the compressor.

* * * * *